United States Patent
Virelizier et al.

(10) Patent No.: US 12,146,813 B2
(45) Date of Patent: Nov. 19, 2024

(54) METHOD FOR CHECKING THE TIGHTNESS OF A DOUBLE-WALLED MOTOR VEHICLE PANEL VIA ULTRASOUND SENSING

(71) Applicant: COMPAGNIE PLASTIC OMNIUM SE, Lyons (FR)

(72) Inventors: François Virelizier, Sainte-Julie (FR); Jérôme Brizin, Sainte-Julie (FR); Eric Stumpp, Sainte-Julie (FR); David Tresse, Sainte-Julie (FR); Julien Guyot, Sainte-Julie (FR)

(73) Assignee: COMPAGNIE PLASTIC OMNIUM SE, Lyons (FR)

( * ) Notice: Subject to any disclaimer, the term of this patent is extended or adjusted under 35 U.S.C. 154(b) by 272 days.

(21) Appl. No.: 17/754,543

(22) PCT Filed: Oct. 7, 2020

(86) PCT No.: PCT/EP2020/078134
§ 371 (c)(1),
(2) Date: Apr. 6, 2022

(87) PCT Pub. No.: WO2021/069500
PCT Pub. Date: Apr. 15, 2021

(65) Prior Publication Data
US 2023/0114942 A1 Apr. 13, 2023

(30) Foreign Application Priority Data

Oct. 7, 2019 (FR) .................................. 1911107
Dec. 18, 2019 (FR) .................................. 1914789

(51) Int. Cl.
*G01M 3/24* (2006.01)

(52) U.S. Cl.
CPC ....................................... *G01M 3/24* (2013.01)

(58) Field of Classification Search
None
See application file for complete search history.

(56) References Cited

U.S. PATENT DOCUMENTS 4,109,922 A   8/1978   Martin
4,719,801 A   1/1988   Blaser et al.
(Continued)

FOREIGN PATENT DOCUMENTS

CH        215694 A       7/1941
CN     105738046 A       7/2016
(Continued)

OTHER PUBLICATIONS

International Search Report and Written Opinion of International Searching Authority for PCT/EP2020/078134, ISA/NL, Rijswijk, Netherlands, Dated: Dec. 9, 2020.

*Primary Examiner* — Patrick Assouad
*Assistant Examiner* — Mark A Shabman
(74) *Attorney, Agent, or Firm* — M&B IP Analysts, LLC

(57) ABSTRACT

A device and method for checking an integrity of a glue joint that connects one portion of a body box and a body skin are provided. The body box and body skin connected by the glue joint define an inner volume therebetween. The method includes arranging at least one ultrasound sensing device in the inner volume; emitting a pressurized directional air jet opposite a predetermined area of the glue joint; recording a noise level detected by the ultrasound sensing device in the inner volume; and determining an integrity defect in the glue joint according to the recorded noise level.

16 Claims, 2 Drawing Sheets

(56) References Cited

U.S. PATENT DOCUMENTS

| | | | |
|---|---|---|---|
| 2003/0154801 A1* | 8/2003 | Georgeson | G01N 29/11 |
| | | | 73/799 |
| 2003/0164044 A1* | 9/2003 | Gayle | G01N 29/4445 |
| | | | 73/592 |
| 2003/0178792 A1 | 9/2003 | Pridmore | |
| 2004/0226379 A1 | 11/2004 | Ochwat et al. | |
| 2008/0271536 A1* | 11/2008 | Ochs | G01M 3/24 |
| | | | 73/579 |
| 2011/0015879 A1* | 1/2011 | Cavallotti | G01M 9/04 |
| | | | 702/54 |
| 2013/0031961 A1 | 2/2013 | Nandwani et al. | |
| 2019/0257792 A1* | 8/2019 | Appelquist | G01N 29/4454 |

FOREIGN PATENT DOCUMENTS

| | | |
|---|---|---|
| DE | 2823976 B1 | 8/1979 |
| DE | 4237527 A1 | 5/1994 |
| DE | 102007046463 A1 | 3/2008 |
| EP | 1450150 A3 | 6/2006 |
| EP | 1988379 A3 | 11/2010 |
| FR | 2301817 A1 | 9/1976 |
| FR | 2349771 A1 | 11/1977 |
| WO | 2007068941 A2 | 6/2007 |
| WO | 2008152667 A1 | 12/2008 |

\* cited by examiner

[Fig. 1]
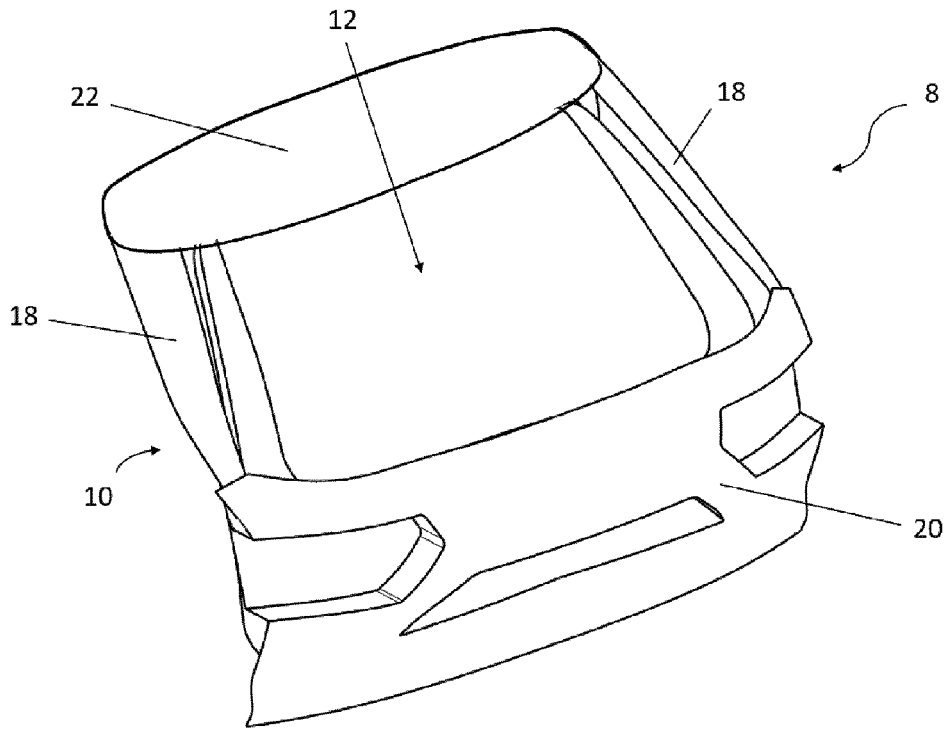
[Fig. 2]
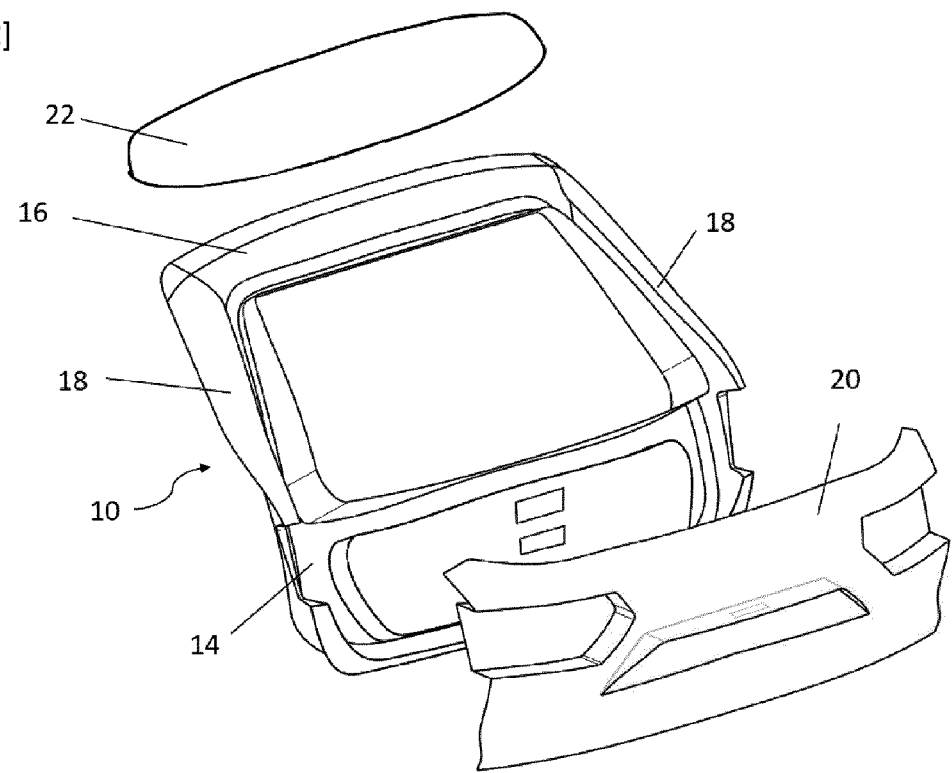

[Fig. 3]
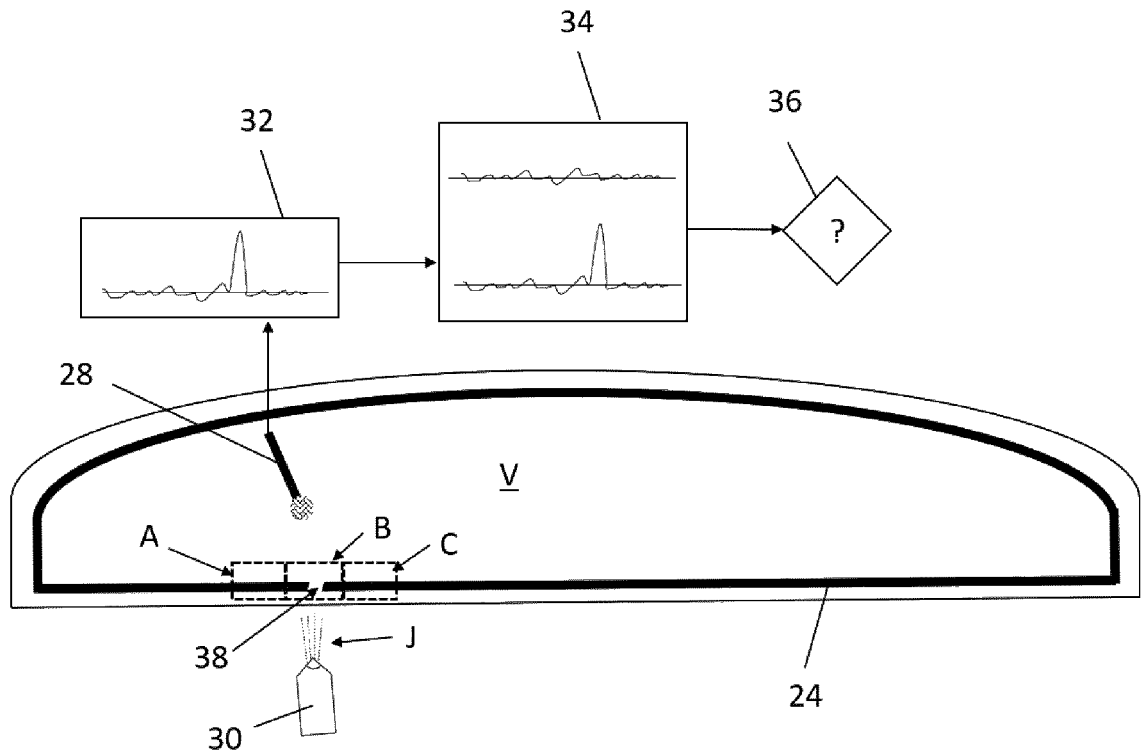
[Fig. 4]
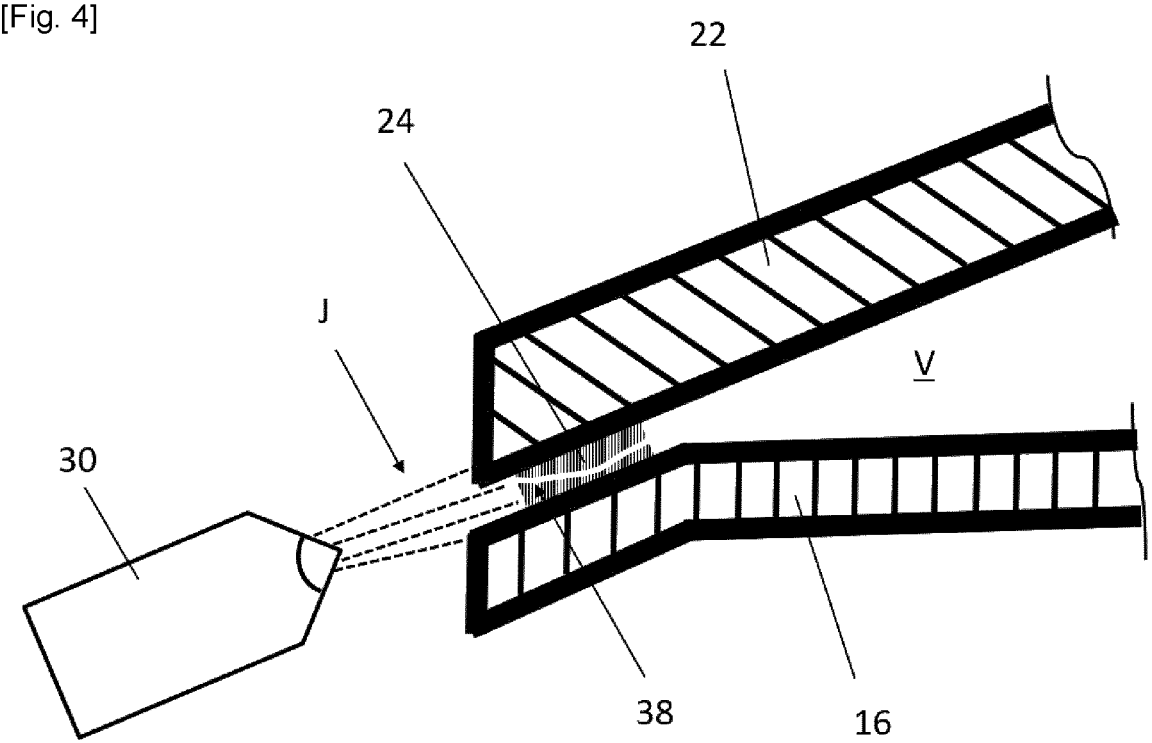

METHOD FOR CHECKING THE TIGHTNESS OF A DOUBLE-WALLED MOTOR VEHICLE PANEL VIA ULTRASOUND SENSING

The present disclosure relates to the general field of checking the tightness of a bonded assembly of motor vehicle parts.

More particularly, it relates to a device for checking the tightness of a motor vehicle body panel including of two plastic walls glued together. Such a panel may be a rear (tailgate) or side (door), front (hood) opening or an aerodynamic spoiler.

At the present time, for example, motor vehicle tailgates most often comprise a box, forming the inner wall of the panel, composed of a lower part, an upper part, as well as one or more body skins covering the parts of the box, which form the outer wall of the panel. The assembly made up of the box and the body skin(s) is called the tailgate panel.

In general, said at least one body skin is attached by gluing to the concerned portion of the box: for this purpose, the skin and the portion of the box each comprise a continuous glue track facing one another. The presence of the glue not only allows the body skin to be assembled to the portion of the box, but also forms a seal between these two elements, and therefore of the panel.

Once the body skin has been attached and glued to the portion of the box, it is necessary to check the tightness of such an assembly, and therefore the integrity of the seal formed by the glue joint. Integrity here means the ability of the seal to perform its tightness function. A decrease in integrity, or leak, may have various causes, such as a damaged or badly positioned seal on the glue track, poor positioning of the skin on the box portion, insufficient pressing of the skin on the box portion, etc.

To check the integrity of the seal formed by the glue joint, the assembly is generally pressurized with air under a clamping bell followed by detection of any pressure differential between, on the one hand, the volume situated between the box part and the body skin thus assembled and, on the other hand, the exterior of the structure. Such a differential signals a leak, or loss of integrity, of the seal formed by the glue joint. To locate the defect, it is also possible to apply a product revealing an air leak along the glue joint.

The checking equipment mentioned above has many drawbacks.

Firstly, it is particularly cumbersome in terms of weight and volume due to its operation under air pressure.

In addition, its implementation as well as its use are long and difficult for an operator, therefore making it costly and incompatible with a more systematic production control than by statistical sampling, a fortiori with a unit checking (at 100%).

Finally, due to the need to cause an overpressure inside the assembled part, the forces applied by the clamping bell are particularly high, which damages the part and then makes it unusable on a vehicle. The clamping forces indeed also have the consequence of damaging the checking means itself, in particular at the seals of the bell.

The object of the present disclosure is in particular to provide a method for checking the tightness of a glued double-walled motor vehicle panel, such as the aforementioned tailgate, which is less bulky, faster and easier to use, does not damage it, and is reliable.

To this end, the present disclosure relates to a method for checking the integrity of a glue joint which is to be checked and which connects one portion of a body box and a body skin, which define an inner volume to be checked therebetween, characterized in that it comprises the following steps, carried out in this order:

arranging at least one ultrasound sensing device in the inner volume;

emitting a pressurized directional air jet opposite a predetermined area of the glue joint;

recording a noise level detected by the ultrasound sensing device in the inner volume; and determining an integrity defect in the glue joint according to the recorded noise level.

The present disclosure therefore allows, using simple and compact means, such as an air jet nozzle and microphones, for example, detection of a drop in integrity in the glue joint by raising the noise level in the inner volume emitted by the air coming from the directional jet having crossed the defect in the glue joint. Indeed, if the noise level recorded in the inner volume due to the application of the air jet opposite a predetermined area of the glue joint is sufficiently high, it signals a defect in this area of the glue joint.

The method proposed by the present disclosure both is simpler and involves less bulky equipment and is easier to use than pressurizing the assembly followed by sensing a possible pressure differential between, on the one hand, the volume located between the box portion and the body skin thus assembled and, on the other hand, the exterior of the structure. Sensing a noise level is also more reliable than using an air leak revealing product, and may also be easily automated. The equipment necessary to implement the checking method according to the present disclosure is without direct contact with the part and therefore does not involve any damage to the assembly to be checked.

Furthermore, it was discovered that the noise level detected inside the inner volume of the assembly was higher due to the emission of a pressurized directional air jet opposite a defect in the glue joint, rather than due to the simple emission of ultrasounds by an ultrasound emitter that would be located opposite such a defect.

Indeed, the forced passage of the air from the jet through the bonding defect, generally a small orifice, produces high-amplitude ultrasounds like a whistle, under the mechanical effect of the pressure of the jet. In addition, the application of the jet allows sensing of certain small orifices in the glue joint, which, partially or totally closed by the assembly pressure exerted by the rest of the joint, would not have been crossed by ultrasounds emitted by a simple ultrasound transmitter Indeed, the pressure of the jet allows these orifices to be opened and thus revealed.

Thus, the method according to the present disclosure allows sensing of accentuated and large-amplitude noise level differences between an area of the glue joint without a defect and an area of the glue joint with a defect, making the doubtful sensing method more reliable.

Preferably, the checking method further comprises a step of comparing the recorded noise level with a reference noise level; and wherein an integrity defect in the glue joint is determined if the recorded noise level is different from the reference noise level.

In fact, given the complex shapes that the box portion and body skin assemblies may assume once assembled and the reverberation effects thus created within the inner volume of the assembly, the noise levels recorded there, even in the absence of defects, differ significantly depending on the areas of the glue joint to be checked. It is therefore preferable to compare the noise level recorded on a part to be checked with a reference noise level corresponding to a compliant part or an average carried out on a batch of compliant parts.

Advantageously, before the step of arranging at least one ultrasound sensing device in the inner volume, the following steps are carried out:
- arranging at least one ultrasound sensing device in the inner volume, called reference volume, defined by a body box portion and a body skin connected by a glue joint not comprising any tightness defect, called reference glue joint;
- emitting a pressurized directional air jet opposite a predetermined area of the reference glue joint;
- detecting the noise level in the reference inner volume; and
- recording the noise level thus detected.

This allows a comparison of the noise levels between a body box section and body skin assembly connected by a glue joint to be checked with an identical assembly, called reference assembly, which is known to present no defect, or an average carried out on a batch of compliant parts.

Preferably, the predetermined area of the reference glue joint corresponds to the same predetermined area of the glue joint to be checked.

Indeed, given that the noise levels recorded in the inner volume of the assembly vary from one area to another of the glue joint, it is preferable to compare the noise levels recorded for the same areas of the reference glue joint and of the glue joint to be checked, two by two.

In order to check several areas of the glue joint, the emission and recording steps are carried out for a plurality of predetermined areas of the glue joint.

Preferably, in order to check the entire glue joint, the predetermined areas are uniformly distributed along the glue joint.

Preferably, in order to more precisely check the entire glue joint, the predetermined areas are contiguous and the union of the predetermined areas includes substantially the entire perimeter of the glue joint.

In order to promote noise emissions in the inner volume and thus to improve sensing thereof in the inner volume of the assembly, the air jet is emitted perpendicular to the glue joint.

In order to further improve noise sensing, the air jet is emitted in the immediate vicinity of the glue joint, preferably at a distance of between 5 and 50 mm from the glue joint.

In the case where the body skin and/or the body box portion contain orifices, a preliminary step is carried out for isolation of the orifices with respect to the external environment.

Indeed, the body skin and/or the body box portion generally comprise at least one, or even several through orifices. In the case of a body skin covering a lower portion of a tailgate box, the orifices correspond in particular to the installation of a license plate light, a tailgate opening control or a signal light housing for a tailgate, and in the case of a box portion, the installation of a third brake light for a spoiler, etc. The isolation step allows sensing only of any leaks due to a localized tightness defect at the glue joint alone, and not the natural evacuation of air through these orifices.

Preferably, the ultrasound sensing device is able to sense sound waves whose frequency is between 5 kHz and 50 kHz.

Given the complex shapes that the box portion and body skin assemblies may assume once assembled and the observed reverberation effects, the noise within the inner volume is more or less disturbed and different noise levels are sensed according to the areas of the glue joint. It is therefore advantageous for the ultrasound sensing device to be able to sense waves over a sufficiently wide range of noise levels.

The present disclosure also relates to a device for checking the integrity of a glue joint that is to be checked and that connects one portion of a body box and a body skin, which define an inner volume therebetween, comprising:
- at least one ultrasound sensing device intended to be arranged in the inner volume;
- a device for emitting a pressurized directional air jet opposite a predetermined area of the glue joint;
- a device for recording a noise level detected by the ultrasound sensing device in the inner volume.

Preferably, the checking device further comprises:
- a device for comparing the recorded noise level with a reference noise level; and
- a device for determining an integrity defect in the glue joint if the recorded noise level is different from the reference noise level.

In the case where the body skin or the box portion is provided with at least one through orifice, called the skin orifice or, respectively, box orifice, at least one vacuum cover intended to cover said at least one skin or, respectively, said at least one box orifice, delimited by two opposite free surfaces, called the inner cover surface and the outer cover surface, the inner cover surface being provided with two seals with a closed contour, respectively called inner and outer cover seals, the contour of the inner cover seal being contained within that of the outer cover seal, the cover being passed through by at least one suction port of the cover opening, on the one hand, between the two cover seals of the side of the inner cover surface and, on the other hand, on the side of the outer cover surface.

Such vacuum covers are described in the French patent application filed under number 1911107, by the same applicant. The vacuum covers allow the orifices of the skin and/or of the box portion to be closed during the process of checking the tightness, to sense only possible leaks due to a lack of tightness localized at the glue joint alone, and not the natural evacuation of air through these orifices.

Advantageously, the checking device further comprises an air suction device connected to the suction port of the cover.

BRIEF DESCRIPTION OF THE FIGURES

The various embodiments will be better understood on reading the description which follows, given solely by way of example and with reference to the appended drawings, in which:

FIG. 1 is a perspective view of a motor vehicle tailgate during assembly;

FIG. 2 is an exploded perspective view of the tailgate of FIG. 1;

FIG. 3 is a schematic view of a spoiler and an upper crosspiece connected by a glue joint and a device for checking the integrity of the glue joint according to the embodiment;

FIG. 4 is a schematic view of a device for emitting a jet of air from the checking device of FIG. 3 and a section of a spoiler and an upper crosspiece connected by a glue joint.

DETAILED DESCRIPTION

FIGS. 1 and 2 show a motor vehicle body panel 8 known per se from the prior art, which is in this case a motor vehicle tailgate panel.

The tailgate panel 8 comprises a box 10 that comprises an opening 12 of the box to accommodate a bezel (not shown in the figures) intended to be attached to the box 10 by gluing.

More specifically, the box 10 comprises a lower portion 14 located below the bezel opening 12, connected to an upper crosspiece 16 by two side uprights 18 of the bezel.

The box 10 is intended to be covered by one or more body skins to form the body panel. As can be seen in FIG. 2, the lower portion of the box 14 of the tailgate here is covered with a lower body skin 20 attached to the box 10 by gluing and the upper crosspiece 16 by another body skin, commonly called spoiler 22.

The lower body skin 20 and the spoiler 22 are respectively assembled on the lower box portion 14 and the upper crosspiece 16 by continuous beads 24 of glue arranged, again in a known manner, on continuous gluing tracks respectively located on the periphery of the lower box portion 20 and of the upper crosspiece. The beads of glue 24 here constitute a glue joint between the lower body skin 20 and the lower box portion 14 on the one hand, and the spoiler 22 on the upper crosspiece 16d, on the other hand. In this way, the box portion and the body skin define an inner volume V therebetween.

To check the integrity of the seal formed by the bead of glue 24, a device 26 for checking the integrity of a glue joint, shown schematically in FIG. 3, is used. In what follows, the glue joint 24 that is checked is the one placed between the spoiler 22 on the upper crosspiece 16. This glue joint 24 is shown schematically in FIG. 3. It will, however, be noted that all that follows is provided for and equally applies to the glue joint 24 connecting the lower box portion 14 and the lower body skin 20.

The checking device 26 comprises an ultrasound sensing device 28 arranged in the inner volume V. For example, it is a microphone 28 capable of sensing ultrasounds. In FIG. 3, only one microphone 28 is shown, but more can of course be placed in the inner volume V if necessary. The ultrasound sensing device is able to sense sound waves whose frequency is between 5 kHz and 50 kHz.

The checking device 26 also comprises a device 30 for emitting a pressurized directional air jet J. It is for example a nozzle connected to an air compression device or any other device allowing the emission of a pressurized directional air jet J. For reasons of clarity, only the nozzle 30 emitting an air jet has been shown in FIGS. 3 and 4.

The nozzle 30 is capable of emitting a pressurized directional air jet opposite a predetermined area of the glue joint 24. To do this, the nozzle 30 may be held in the hand by an operator, or by an articulated arm of a robot (not shown).

The checking device 26 also comprises a device 32 for recording a noise level detected by the ultrasound sensing device (microphone 28) in the inner volume.

The checking device 26 also comprises a device 34 for comparing the recorded noise level with a reference noise level and a device 36 for determining an integrity defect 38 in the glue joint 24 if the recorded noise level is different from the reference noise level. Here in the figures, the integrity defect 38 is a through orifice in the glue joint 24.

We will now describe the method for checking the integrity of a glue joint 24 to be checked using the checking device 26.

Initially, at least one ultrasound sensing device, here one or more microphones 28, is placed in the inner volume of an assembly formed by an upper crosspiece and a spoiler connected by a glue joint not comprising any tightness defect.

If the body skin and/or the body box portion in question contain orifices, a preliminary step is carried out for isolation of these orifices with respect to the external environment. This step is carried out either before or after arranging the microphones 28.

In the following, this defect-free glue joint will be called a "reference joint," and the assembly whose glue joint is a reference glue joint will be called a "reference assembly." The reference assembly is an assembly of parts identical to those to be tested, which may in particular come from the same production line. It is therefore here an assembly of a spoiler 22 on an upper crosspiece 16 whose glue joint does not present any defects.

It will also be noted that, insofar as the following steps are the same for a reference joint or a glue joint 24 that one wishes to test, reference is made to FIGS. 3 and 4, even though the glue joint 24 has a defect 38. Indeed, the only difference between the glue joint 24 to be checked and the reference joint here is the absence of a defect 38.

Once the sensing device 28 has been placed in the reference volume V of the reference assembly, a pressurized directional air jet J is emitted opposite a predetermined area of the reference glue joint.

In order to promote noise emissions in the inner volume V and thus to improve sensing thereof in the inner volume V, the air jet J is emitted perpendicular to the glue joint 24, as can be seen in FIG. 4.

In order to further improve noise sensing, the air jet J is emitted in the immediate vicinity of the glue joint 24, preferably at a distance of between 5 and 50 mm from the glue joint 24.

Then, the noise level is detected in the reference inner volume V using the microphone(s) 28, and the noise level thus recorded, called reference noise level, is recorded using the recording device 32.

The emission and recording steps described below are performed for a plurality of predetermined areas of the reference glue joint. FIG. 3 shows three predetermined areas A, B and C that are preferably contiguous, like in FIG. 3.

These predetermined areas are preferably evenly distributed along the glue joint 24. Additionally, preferably, the union of the predetermined areas includes substantially the entire perimeter of the reference glue joint. However, for reasons of clarity, only three of these areas A, B, C have been shown in FIG. 3.

In fact, given the complex shapes that the box and body skin assemblies may assume (here a spoiler and an upper crosspiece) once assembled and the reverberation effects thus created within the inner volume of the assembly, the noise levels sensed there, even in the absence of defects, differ significantly depending on the areas of the reference glue joint.

A reference noise value is therefore recorded for each of the predetermined areas. A sound map of the reference glue joint is thus obtained, that is to say, a set of pairs of associated values, namely a reference noise level associated with a predetermined area.

It will be noted that in a variant, the value of the reference noise level associated with a predetermined area of the reference glue joint may be the result of an average of noise levels recorded for the same predetermined area of several identical conforming parts.

In still other variants, the reference noise levels per predetermined area, in other words the sound mapping as defined above, may include more data, called reference data, linked to the noise level value per predetermined area read for one or more reference glue joints. It will thus be possible to record a minimum and/or a maximum of noise read by taking a reading of the noise level for a given length of time, taking averages of noise levels, calculating a standard deviation of the recorded noise levels, etc. These reference data will be compared two by two with data of the same nature related to the noise level recorded for the glue joint to be checked.

Once this mapping has been obtained, at least one ultrasound sensing device, here one or more microphones 28, is placed in the inner volume V of an assembly to be checked.

Then, a pressurized directional air jet J is emitted opposite a predetermined area of the glue joint 24. It will preferably be ensured that the emission conditions of the air jet J are the same as the emission conditions of the air jet J opposite the reference glue joint, in order to obtain a more reliable comparison of the recorded noise levels.

In addition, still preferably, the predetermined area of the reference glue joint corresponds to the same predetermined area of the glue joint 24 to be checked. The directional air jet J will therefore be emitted opposite the same predetermined areas, here represented by areas A, B, C in FIG. 3. For this purpose, the nozzle 30 may be made to travel along the glue joint 24 to be checked by an operator.

However, preferably, the nozzle 30 will be held by an articulated arm of a robot (not shown) which sweeps the glue joint 24 over so as to emit the directional air jet J opposite the predetermined areas. Preferably, the robot performs such sweeping so that the nozzle 30 is placed at a fixed distance from the glue joint 24 during the sweeping, in other words so that the directional air jet J is always emitted at the same distance from the glue joint 24 when sweeping. In a preferred embodiment, the sweeping performed by the robot will be around the entire perimeter of the glue joint 24.

The noise level sensed by the ultrasound sensing device 28 in the inner volume V is then recorded and the presence of an integrity defect in the glue joint is determined according to the recorded noise level.

To this end, preferably, the noise level thus recorded is compared with the reference noise level recorded for the same predetermined area. Thus, if, for example, the noise level recorded for area A of the reference glue joint has been recorded, a comparison is done with the noise level recorded for the same area A of the glue joint 24 to be checked.

If the noise level thus recorded is different from the reference noise level, it can be determined that there is an integrity defect 38 in the glue joint 24.

Returning to the example of FIG. 3, since areas A and C do not present any defect in the glue joint 24, noise levels will be found in these areas that are identical or very similar to the noise levels recorded for these respective areas A and C of the reference joint. Conversely, since area B includes a tightness defect 38, a different noise level will be noted for area B, in practice higher, than the noise level for area B of the reference glue joint.

By carrying out these successive steps for predetermined areas, the union of which includes substantially the entire perimeter of the glue joint 24, it is possible to determine where the possible integrity defects are located over its entire perimeter and to determine whether the glue joint 24 is compliant.

The various embodiments described herein are not limited to the embodiments described here, and other embodiments will become clearly apparent to a person skilled in the art.

It is in particular possible to use the method and the device for checking the integrity of a glue joint to check the tightness of other body panels resulting from the assembly of two panels by gluing.

What is claimed is:

1. A method for checking an integrity of a glue joint comprising:
   arranging at least one ultrasound sensing device in an inner volume defined between one portion of a body box and a body skin;
   emitting a pressurized directional air jet on an opposite side of a predetermined area of a glue joint connecting said portion of the body box and said body skin, wherein the opposite side of the predetermined area of the glue joint is not in the inner volume;
   recording a noise level detected by the at least one ultrasound sensing device in the inner volume; and
   determining an integrity defect in the glue joint according to the recorded noise level.

2. The method according to claim 1, further comprising:
   comparing the recorded noise level with a reference noise level; and
   wherein the integrity defect in the glue joint is determined if the recorded noise level is different from the reference noise level.

3. The method according to claim 1, further comprising the following steps, carried out before the step of arranging at least one ultrasound sensing device in the inner volume to be checked:
   arranging the at least one ultrasound sensing device in a reference inner volume, defined by a reference body box portion and a reference body skin connected by a reference glue joint not including any tightness defect;
   emitting the pressurized directional air jet opposite a predetermined area of the reference glue joint;
   detecting a noise level in the reference inner volume; and
   recording the noise level thus detected as a reference noise level.

4. The method according to claim 3, wherein the predetermined area of the reference glue joint corresponds to the same predetermined area of the glue joint to be checked.

5. The method according to claim 1, wherein the emitting and recording steps are carried out for a plurality of predetermined areas of the glue joint.

6. The method according to claim 5, wherein the plurality of predetermined areas are uniformly distributed along the glue joint.

7. The method according to claim 5, wherein the plurality of predetermined areas is contiguous and a union of the plurality of predetermined areas includes an entire perimeter of the glue joint.

8. The method according to claim 1, wherein emitting the pressurized directional air jet takes place perpendicular to the glue joint.

9. The method according to claim 1, wherein the pressurized directional air jet is emitted in an immediate vicinity of the glue joint.

10. The method according to claim 1, wherein, if at least one of: the body skin and the one portion of the body box in question contain orifices, a preliminary step is carried out for isolation of the orifices with respect to an external environment.

11. The method according to claim 1, wherein the at least one ultrasound sensing device is able to detect sound waves whose frequency is between 5 kHz and 50 KHz.

12. The method according to claim 1, wherein the pressurized directional air jet is emitted in an immediate vicinity of the glue joint at a distance of between 5 and 50 mm from the glue joint.

13. A device for checking an integrity of a glue joint, comprising:

at least one ultrasound sensor intended to be arranged in an inner volume defined between one portion of a body box and a body skin;

an air-jet emitting device, wherein the air-jet emitting device is configured to emit a pressurized directional air jet on an opposite side of a predetermined area of a glue joint connecting said portion of the body box and said body skin, wherein the opposite side of the predetermined area of the glue joint is not in the inner volume; and a recorder, wherein the recorder records a noise level detected by the at least one ultrasound sensor in the inner volume.

14. The device according to claim 13, further comprising:

a comparison device, wherein the comparison device compares a recorded noise level with a reference noise level; and a first device for determining an integrity defect in the glue joint if the recorded noise level is different from the reference noise level.

15. The device according to claim 13, further comprising: at least one vacuum cover to cover at least one orifice, wherein the at least one orifice is any one of: a skin orifice on the body skin and a box orifice on the one portion of the body box, wherein the at least one orifice is delimited by an inner cover surface and an outer cover surface, wherein the inner cover surface and the outer cover surface are opposite free surfaces, wherein the inner cover surface is provided with two cover seals with a closed contour, wherein the two cover seals are an inner cover seal and an outer cover seal and the closed contour of the inner cover seal is contained within that of the outer cover seal, wherein the at least one vacuum cover is passed through by at least one suction port of the cover, the suction port opening, at one end, between the two cover seals on the inner cover surface side and, at the other end, on the outer cover surface side.

16. The device according to claim 15, further comprising: an air suction device connected to the at least one suction port of the cover.

* * * * *